(12) United States Patent
Schaffert

(10) Patent No.: US 9,456,542 B2
(45) Date of Patent: Oct. 4, 2016

(54) DEBRIS ASSEMBLY FOR AN AGRICULTURAL ROW UNIT

(71) Applicant: SCHAFFERT MANUFACTURING COMPANY, INC., Indianola, NE (US)

(72) Inventor: Paul E. Schaffert, Indianola, NE (US)

(73) Assignee: Schaffert Manufacturing Company, Inc., Indianola, NE (US)

( * ) Notice: Subject to any disclaimer, the term of this patent is extended or adjusted under 35 U.S.C. 154(b) by 380 days.

(21) Appl. No.: 13/834,655

(22) Filed: Mar. 15, 2013

(65) Prior Publication Data

US 2014/0262381 A1    Sep. 18, 2014

(51) Int. Cl.
    A01C 5/06    (2006.01)
    A01C 7/00    (2006.01)
    A01B 15/16   (2006.01)

(52) U.S. Cl.
    CPC ............ *A01C 5/064* (2013.01); *A01B 15/16* (2013.01); *A01C 7/006* (2013.01); *Y02P 60/23* (2015.11)

(58) Field of Classification Search
    CPC ........ A01C 5/064; A01C 5/062; A01C 5/06; A01C 5/00; A01C 7/006; A01C 7/00; A01B 15/16; A01B 15/00; Y02P 60/23; Y02P 60/20; Y02P 60/00
    See application file for complete search history.

(56) References Cited

U.S. PATENT DOCUMENTS

| | | | |
|---|---|---|---|
| 13,683 A | 10/1855 | McCormick | |
| 35,510 A | 6/1862 | De Haven | |
| 122,299 A | 12/1871 | Wight et al. | |
| 176,708 A | 4/1876 | Templin | |
| 203,207 A | 4/1878 | Springer | |
| 211,601 A | 1/1879 | Springer | |
| 252,265 A | 1/1882 | Scofield | |
| 288,661 A | 11/1883 | Purdy et al. | |
| 308,327 A | 11/1884 | Runstetler | |
| 322,841 A | 7/1885 | Miskimen | |
| 555,897 A | 3/1896 | Crane | |
| 889,947 A | 6/1908 | Miller | |
| 909,137 A | 1/1909 | Bellerive | |
| 1,473,297 A | 11/1923 | Knight | |
| 2,533,374 A | 12/1950 | Hyland | |
| 2,805,486 A | 9/1957 | Barrett | |
| 2,849,969 A | 9/1958 | Taylor | |
| 2,872,883 A | 2/1959 | Padrick | |
| 3,115,192 A | 12/1963 | Bushmeyer | |
| 3,177,830 A | 4/1965 | Zimmerman | |
| 3,336,885 A | 8/1967 | Lebow | |

(Continued)

FOREIGN PATENT DOCUMENTS

DE    3321490    12/1984
DE    3441610    5/1986

OTHER PUBLICATIONS

U.S. Appl No. 13/428,922, filed Mar 23, 2012, 136 pages.

(Continued)

*Primary Examiner* — Christopher J Novosad
(74) *Attorney, Agent, or Firm* — Dorsey & Whitney LLP

(57) ABSTRACT

A debris assembly for use with a mobile agricultural device is provided. The debris assembly may include a debris member and an attachment bracket. The debris member may substantially prevent debris from accumulating on the disc of the mobile agricultural device. The debris member may be adjustable as a single component relative to the disc to accommodate various soil conditions. The debris member may be removable from the attachment bracket.

13 Claims, 8 Drawing Sheets

(56) References Cited

U.S. PATENT DOCUMENTS

| | | | |
|---|---|---|---|
| 3,599,729 | A | 8/1971 | Greemore |
| 3,666,572 | A | 5/1972 | Nakagawa et al. |
| 3,895,589 | A | 7/1975 | Garner et al. |
| 4,108,089 | A | 8/1978 | van der Lely |
| 4,148,267 | A | 4/1979 | Bennett et al. |
| 4,253,412 | A | 3/1981 | Hogenson |
| 4,276,836 | A | 7/1981 | Pust |
| 4,294,181 | A | 10/1981 | Smith |
| 4,373,455 | A | 2/1983 | Friggstad |
| 4,398,478 | A | 8/1983 | Frase et al. |
| 4,542,705 | A | 9/1985 | Orth |
| 4,565,141 | A | 1/1986 | Kopecky |
| 4,580,507 | A | 4/1986 | Dreyer et al. |
| 4,607,581 | A | 8/1986 | Kopecky |
| 4,628,841 | A | 12/1986 | Powilleit |
| 4,671,193 | A | 6/1987 | States |
| 4,674,419 | A | 6/1987 | Kopecky |
| 4,819,737 | A | 4/1989 | Frase |
| 4,911,090 | A | 3/1990 | Schimke |
| 5,078,528 | A | 1/1992 | Schmidt |
| 5,092,255 | A | 3/1992 | Long et al. |
| 5,361,848 | A | 11/1994 | Fleischer et al. |
| 5,375,542 | A | 12/1994 | Schaffert |
| 5,398,771 | A | 3/1995 | Hornung et al. |
| 5,425,318 | A | 6/1995 | Keeton |
| 5,640,915 | A | 6/1997 | Schaffert |
| 5,673,638 | A | 10/1997 | Keeton |
| 5,730,074 | A | 3/1998 | Peter |
| 5,852,982 | A | 12/1998 | Peter |
| 5,884,711 | A | 3/1999 | Shoup |
| 5,904,107 | A | 5/1999 | Kester |
| 5,918,557 | A | 7/1999 | Schaffert |
| 5,996,514 | A | 12/1999 | Arriola et al. |
| 6,082,274 | A | 7/2000 | Peter |
| 6,082,275 | A | 7/2000 | Schaffert |
| 6,119,608 | A | 9/2000 | Peterson et al. |
| 6,148,747 | A | 11/2000 | Deckler et al. |
| D440,985 | S | 4/2001 | Noonan et al. |
| 6,209,466 | B1 | 4/2001 | Wodrich |
| 6,220,191 | B1 | 4/2001 | Peter |
| 6,283,050 | B1 | 9/2001 | Schaffert |
| 6,321,667 | B1 | 11/2001 | Shoup |
| 6,453,832 | B1 | 9/2002 | Schaffert |
| 6,530,334 | B2 | 3/2003 | Hagny |
| 6,640,732 | B2 | 11/2003 | Prairie et al. |
| 6,763,773 | B2 | 7/2004 | Schaffert |
| 7,121,216 | B2 | 10/2006 | Schaffert |
| 7,360,495 | B1 | 4/2008 | Martin |
| 7,410,005 | B2 | 8/2008 | Lung et al. |
| 7,552,689 | B2 | 6/2009 | Schaffert |
| 7,581,503 | B2 | 9/2009 | Martin |
| 7,707,952 | B2 | 5/2010 | Schaffert |
| 7,975,629 | B1 | 7/2011 | Martin |
| 8,047,301 | B2 | 11/2011 | Friggstad et al. |
| 8,356,563 | B2 * | 1/2013 | Schaffert et al. ............. 111/121 |
| 9,204,590 | B2 | 12/2015 | Schaffert et al. |
| 9,232,689 | B2 | 1/2016 | Trevino et al. |
| 2002/0078869 | A1 | 6/2002 | Brummelhuis |
| 2003/0051650 | A1 | 3/2003 | Engelke et al. |
| 2005/0072344 | A1 | 4/2005 | Kester |
| 2005/0155536 | A1 | 7/2005 | Wendte et al. |
| 2007/0113763 | A1 | 5/2007 | Schaffert |
| 2007/0278272 | A1 | 12/2007 | Fast |
| 2008/0011208 | A1 | 1/2008 | Martin |
| 2008/0066662 | A1 | 3/2008 | Hesla |
| 2008/0257237 | A1 | 10/2008 | Friesen et al. |
| 2008/0303238 | A1 | 12/2008 | Fichter |
| 2009/0000796 | A1 * | 1/2009 | Cooper et al. ................ 172/563 |
| 2009/0056962 | A1 | 3/2009 | Martin et al. |
| 2009/0084295 | A1 | 4/2009 | Schaffert |
| 2009/0235853 | A1 | 9/2009 | Schaffert |
| 2013/0074747 | A1 | 3/2013 | Schaffert |
| 2013/0263767 | A1 | 10/2013 | Trevino |

OTHER PUBLICATIONS

Utility U.S. Appl No. 13/646,507, filed Oct. 5, 2012, 126 pages.
"1200 Series Advanced Seed Meter Planters", Case lil, 2005, 1-35.
"3000 Series Kinze Planters", 2003, 3-6 and 12.
"8000 Series Planters: Simply Advanced", White Planters, 2001, 13-15.
"Brochure: The Precision Vacuum Planter, NG Plus Series", A.T.I., Inc., Monosem, Lenexa, Kansas, at least as early as Dec. 21, 2007, and Photos A-G, Dec. 21, 2007, 10 pages.
"Changing Planting Depth", Operating the Planter, Dec. 21, 2007, 45-47.
"Cost-Effective Solutions for Real-World Needs", Yetter Profitable Solutions, Dec. 21, 2007, 1-27.
"Dawn 1572/1500 Coulter Combo", Jul. 28, 2004, 2 pages.
"Dawn Curvtine™ Closing Wheel", 1997, 2 pages.
"Dawn Trashwheels Row Cleaner", Dec. 21, 2007, 1 page.
"Ferti-Placer", Schaffert Manufacturing Co., Inc., Dec. 21, 2007, 2 pages.
"Groff AG Improvements, LLC", Dec. 21, 2007, 4 pages.
"Hawkins Manufacturing Inc.", 2002, 1 page.
"Heavy-Duty Coulter", Dec. 21, 2007, 3 pages.
"http://precisionplanting.com/html/keeton.html", Dec. 30, 2000, 1 page.
"Keeton Seed Firmer", J & K Enterprises, 1994, 2 pages.
"Keeton Seed Firmer, Precision Planting", Apr. 9, 2001, 4 pages.
"Photos Labeled "Photo A" and Photo B", Oct. 17, 2007, 1 page.
"Planter "N" Forcer, Planter Fertilizer Attachments online product information description", Hawkins Mfg. Inc. Retrieved from http://www.hawkinsmfg.com/ attachments.htm on Dec. 9, 2012, 2 pages.
"Planter Fertilizer Attachments", Hawkins Manufacturing Inc., Dec. 21, 2007, 4 pages.
"Seed to Soil Inforcer", Seed Flap, Spring 1995, 1 page.
"Sunco: Effectively Moves Trash in All Conditions!", Dec. 21, 2007, 2 pages.
"Sunco: Your Solution for Accurate Starter Fertilizer Placement", Dec. 21, 2007, 2 pages.
"Tine-Tooth Row Tillage Attachment", Dec. 21, 2007, 9 pages.
"Tube Alignment Brackets", M & J Cotton Farms, Inc., Oct. 30, 1995, 1 page.
"We Know It's All About Strong Roots", Yetter Profitable Solutions, Dec. 21, 2007, 1-27.
"Yield-Pro Planters: Unsurpassed in form, function and safety", Great Plains, Dec. 21, 2007, 4, 5 and 10.
"Yield-Pro Planters: Yield Increasing Row Spacing Options Coupled with Best in Class Productivity and Accuracy", Dec. 21, 2007, 1 page.
Finck, , "Where to start with starter fertilizer", Farm Journal, Jan. 1996, 15-16.
U.S. Appl. No. 12/341,978, filed Dec. 22, 2008.
U.S. Appl. No. 13/333,356, filed Dec. 21, 2011.
U.S. Appl. No. 13/428,922, filed Mar. 23, 2012 .
U.S. Appl. No. 13/646,507, filed Oct. 5, 2012.
U.S. Appl. No. 14/202,435, filed Mar. 10, 2014.

* cited by examiner

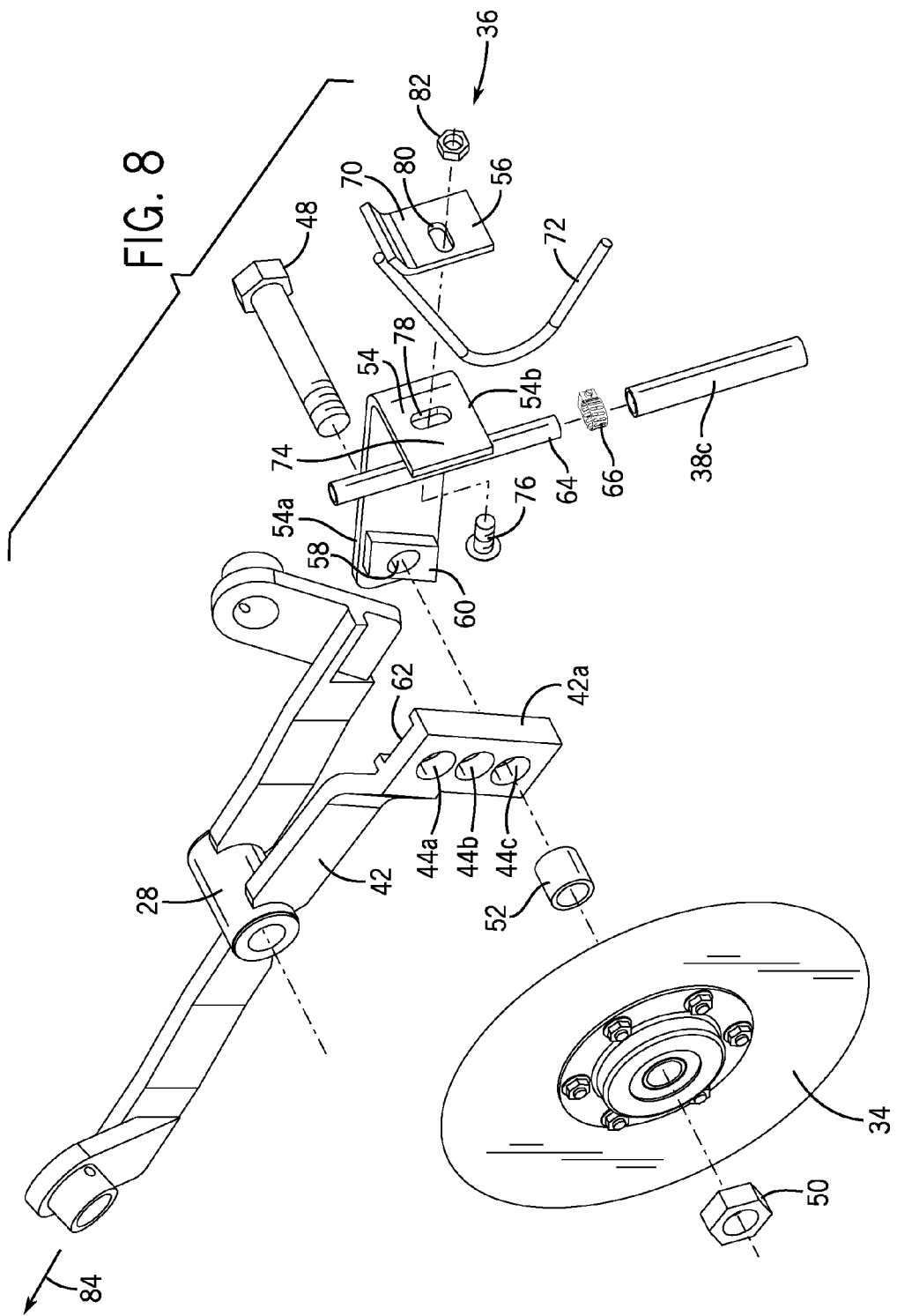

DEBRIS ASSEMBLY FOR AN AGRICULTURAL ROW UNIT

FIELD

The present disclosure relates to an agricultural device. More specifically, the present disclosure relates to a debris assembly for an agricultural row unit.

BACKGROUND

Agricultural seed planting is typically accomplished by multi-row planters. Each planter includes a plurality of row units adapted for opening a seed furrow, depositing seeds within the furrow, and closing the seed furrow around the seeds. In some cases, each row unit of the planter also is adapted to open a fertilizer furrow, deposit liquid fertilizer in each fertilizer furrow, and close each fertilizer furrow.

Each row unit of the planter may include a disc that travels along the planting area and opens the fertilizer furrow. As the disc of each row unit travels along the planting area, the disc may collect debris from the area, for example, root balls, cobbs, stalks, etc. This debris (also referred to as "trash") may interfere with the rotation of the disc. In some instances, the debris may cause the disc to rotate unevenly or even completely stop rotation, such that the disc is dragged. The uneven rotation or dragging of the disc may prevent the disc from adequately opening a fertilizer furrow. Additionally or alternatively, the uneven rotation or dragging of the disc may result in debris buildup in front of the disc, which may adversely affect seed placement and/or liquid fertilization distribution. For example, uneven seed placement may result in some seeds being placed too deep or too shallow within the furrow. Also, uneven seed placement may result in some seeds being offset from a row, which may cause the seed to receive inadequate fertilizer and/or water and/or to be trampled by people or equipment if the seed is able to germinate. Similarly, if the liquid fertilizer is offset and unevenly distributed, some seeds may not receive any fertilizer and may not germinate and others may receive too much fertilizer and may die.

SUMMARY

In one example, a debris assembly for an agricultural row unit having a furrow opener is provided. The debris assembly may include a bracket attached to the agricultural row unit and a debris member, having a base, slidably attached to the bracket. The base of the debris member may be slidable relative to the bracket. The debris member may be removably attached to the bracket. The debris member may include a positioning element that slidably bears against a portion of the bracket. The debris member may include an elongate element that is fixedly attached to the positioning element. The elongate element may define an interior acute angle.

In another example, a row unit for an agricultural planter is provided. The row unit may include a chassis, a disc rotatably coupled to the chassis and configured to create a furrow, and a debris member operably coupled to the chassis and positioned laterally adjacent the disc. The debris member may be slidable relative to the disc. The chassis may include a cantilevered arm with a free end, and the disc may be rotatably coupled to the free end of the cantilevered arm. The free end of the cantilevered arm may include a plurality of vertically-spaced apertures.

The row unit may further include a bracket configured to interconnect the debris member and the chassis. The bracket may include a boss that is slidably received within a guide track formed in a free end of a cantilevered arm. The bracket may be adjustably coupled to the chassis. The debris member may be slidably coupled to the bracket. The debris member may include an elongate element forming an apex directed towards a rotation axis of a disc. The elongate element may have a first end coupled to the bracket and a second free end directed away from the rotation axis of the disc.

In a further example, a row unit for an agricultural planter is provided. The row unit may include a chassis, a rotatable disc attached to the chassis and configured to create a furrow, a bracket attached to the chassis, and an elongate rod movably attached to the bracket and laterally adjustable relative to the disc. The bracket may be L-shaped and may include a leg portion that extends transverse to the disc.

The row unit may further include a positioning element that slidably bears against a leg portion. The elongate rod may be attached to the positioning element. A first slot may be defined by the leg portion of the bracket. A second slot may be defined by the positioning element. A fastener may extend through the first and second slots to secure the bracket and the positioning element together. At least one of the first slot or the second slot may be oriented transverse to a direction of travel of the disc. In one implementation, one of the first slot or the second slot may be oriented transverse to a direction of travel of the disc. The other of the first slot or the second slot may be oriented in line to the direction of travel of the disc.

While multiple examples are disclosed, still other examples of the present disclosure will become apparent to those skilled in the art from the following detailed description, which shows and describes illustrative examples of the present disclosure. As will be realized, the disclosed subject matter is capable of modifications in various aspects, all without departing from the spirit and scope of the claimed subject matter. Accordingly, the drawings and detailed description are to be regarded as illustrative in nature and not restrictive.

BRIEF DESCRIPTION OF THE DRAWINGS

FIG. 8 is an exploded view of a part of the one row unit illustrated in FIG. 3 with an alternative slot configuration compared to FIG. 4.

DETAILED DESCRIPTION

Disclosed herein is a debris member for use with an agricultural row unit (e.g., a drill assembly, fertilizer assembly, planting assembly, ripper, coulter, etc.). As a tractor (or other device) pulls or tows a row unit across a planting area (such as a field), the debris member may displace, knock off, or otherwise remove debris attached to or accumulated on a disc associated with the row unit.

The debris member may be adjustable and may be referred to as a debris deflector, debris remover, or disc scraper. The debris member may be movably attached to any part of a row unit to permit a user to selectively adjust the debris member relative to a disc. In one implementation, the debris member is slidably coupled to a fertilizer assembly associated with a fertilizer disc. In this implementation, the debris member may be slidably coupled to a bracket that may support a fertilizer tube near the disc. The bracket may be attached to the row unit near an attachment point of the disc. In one implementation, a fastener used to secure the disc to the planting assembly also secures the bracket to the planting assembly. The debris member may be movable in one or more directions relative to the bracket, the disc, or both.

The debris member may be moved as a unitary component or device laterally toward and away from the disc. The distance between the debris member and the disc may be adjusted by a user, such as a farmer, to prevent a substantial amount of debris from aggregating on the disc, which may affect the operation of the disc. The lateral distance between the debris member and the disc may range from fractions of an inch to many inches, depending on the size of the disc, field conditions (soil type, debris type and size, moisture content, and other field characteristics), and other factors.

Figure 1:
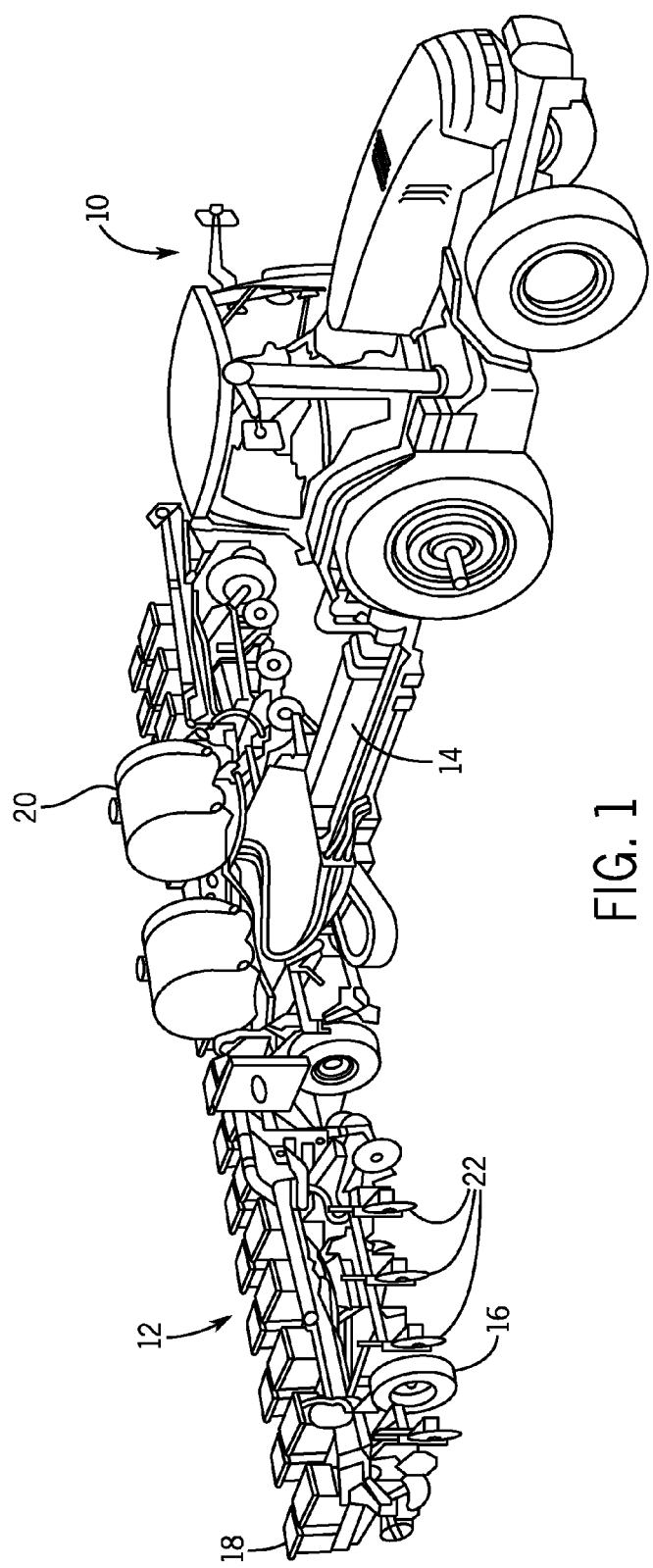
FIG. 1 is an isometric view of a tractor pulling a seed planter.

FIG. 1 illustrates a tractor 10 pulling a planter assembly 12. The planter assembly 12 may include a tongue 14 configured to attach to a rear portion of the tractor 10 and wheels 16 for supporting the planter assembly 12. The planter assembly 12 also may include a seed hopper 18, a fertilizer storage tank 20, and seed discs 22. The seed hopper 18 may be configured store a plurality of seeds before the seeds are deposited into a seed furrow. The fertilizer storage tank 20 may be configured to store fertilizer before the fertilizer is deposited within a seed furrow or an adjacent fertilizer furrow. The seed discs 22 may be configured to create or open seed furrows, for example, as the tractor 10 tows the planter assembly 12 along a field. The seed discs 22 may be configured to create a slit, a slot, or a generally V-shaped furrow in the ground.

Figure 2:
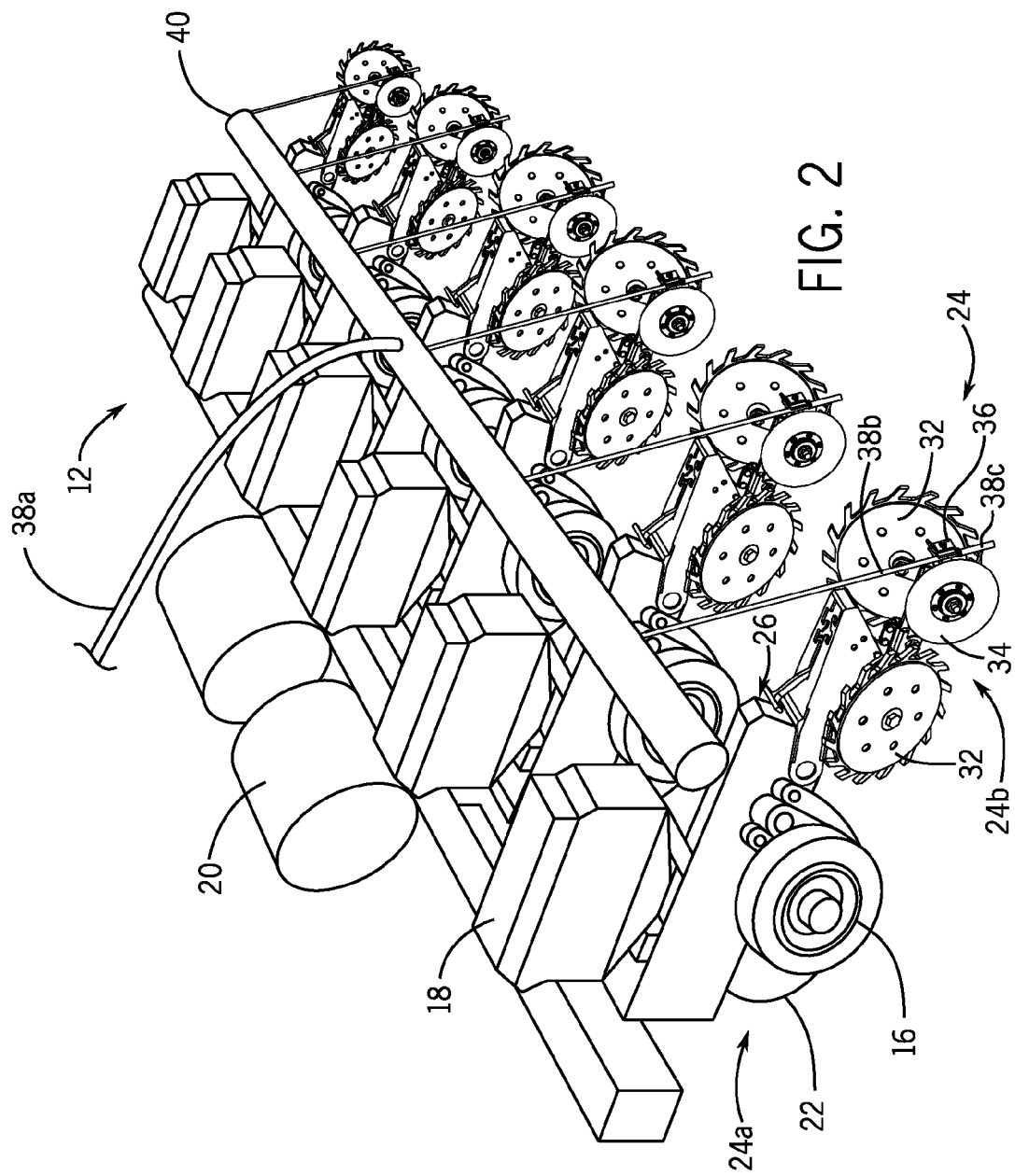
FIG. 2 is top rear partial isometric view of the seed planter illustrated in FIG. 1 including a plurality of row units each having an example debris member.

FIG. 2 illustrates a partial enlarged view of the planter assembly 12. The planter assembly 12 may include a plurality of row units 24 each associated with an individual row of a field. Each row unit 24 may include a front section 24a and a rear or tail section 24b. The front section 24a of each row unit 24 may be include a seed disc 22 configured to open a seed furrow and a depositing assembly 26 configured to deposit seeds within the seed furrow. The depositing assembly 26 may receive seeds from a seed hopper 18 associated with the respective row unit 24. Each depositing assembly 26 may include a seed tube and a rebounder, for example, to deposit the seeds in the seed furrow.

Figure 3:
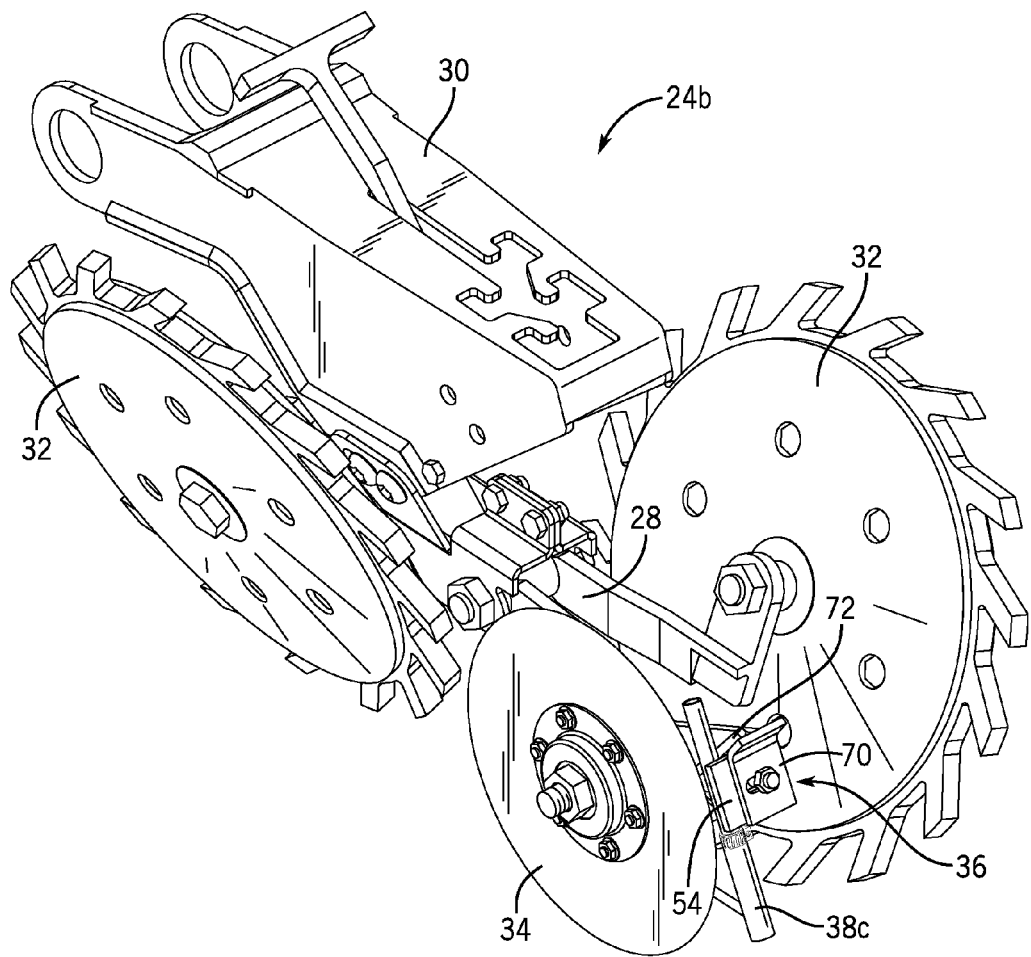
FIG. 3 is a top rear isometric view of one row unit of the plurality of row units illustrated in FIG. 2.

The tail section 24b of each row unit 24 is enlarged in FIG. 3. The tail section 24b may include a chassis 28, a body 30 interconnecting the chassis 28 to the front section 24a of a respective row unit 24, a pair of longitudinally staggered wheels 32 rotatably coupled to the chassis 28, a fertilizer disc 34 rotatably coupled to the chassis 28, and a fertilizer assembly 36 coupled to the chassis 28. Each of the wheels 32 may have a positive camber such that the bottoms of the pair of wheels 32 are closer to one another than the tops of the pair of wheels 32. The pair of wheels 32 associated with an individual row unit 24 may be configured to close a seed furrow after the depositing assembly 26 has placed seeds in the seed furrow. Each wheel 32 may be spiked to assist in closing the seed furrow.

The fertilizer disc 34 may be configured to create or open a fertilizer furrow. The fertilizer disc 34 may be aligned with or laterally offset from the seed disc 22 such that a resulting fertilizer furrow is aligned with or laterally adjacent a respective seed furrow. The fertilizer assembly 36 may be fluidly connected to a fertilizer storage tank 20 (see FIG. 1) via one or more fertilizer tubes 38 and configured to deliver fertilizer into a fertilizer furrow as the tractor 10 pulls the planter assembly 12 through a field.

With reference back to FIG. 2, an example fertilizer system includes a first fertilizer tube 38a that fluidly connects a fertilizer storage tank 20 (see FIG. 1) to a fertilizer bar or manifold 40. A pump (not illustrated) may deliver the fertilizer from the fertilizer storage tank 20 to the fertilizer bar 40 via the first fertilizer tube 38a. A set of second fertilizer tubes 38b may fluidly connect the fertilizer bar 40 to a set of third fertilizer tubes 38c, each of which may be associated with an individual row unit 24. In an alternative implementation, the second and third sets of fertilizer tubes 38b, 38c may be replaced with a single set of fertilizer tubes, each of which transport the fertilizer from the fertilizer bar 40 directly to an individual fertilizer furrow.

Figure 4:
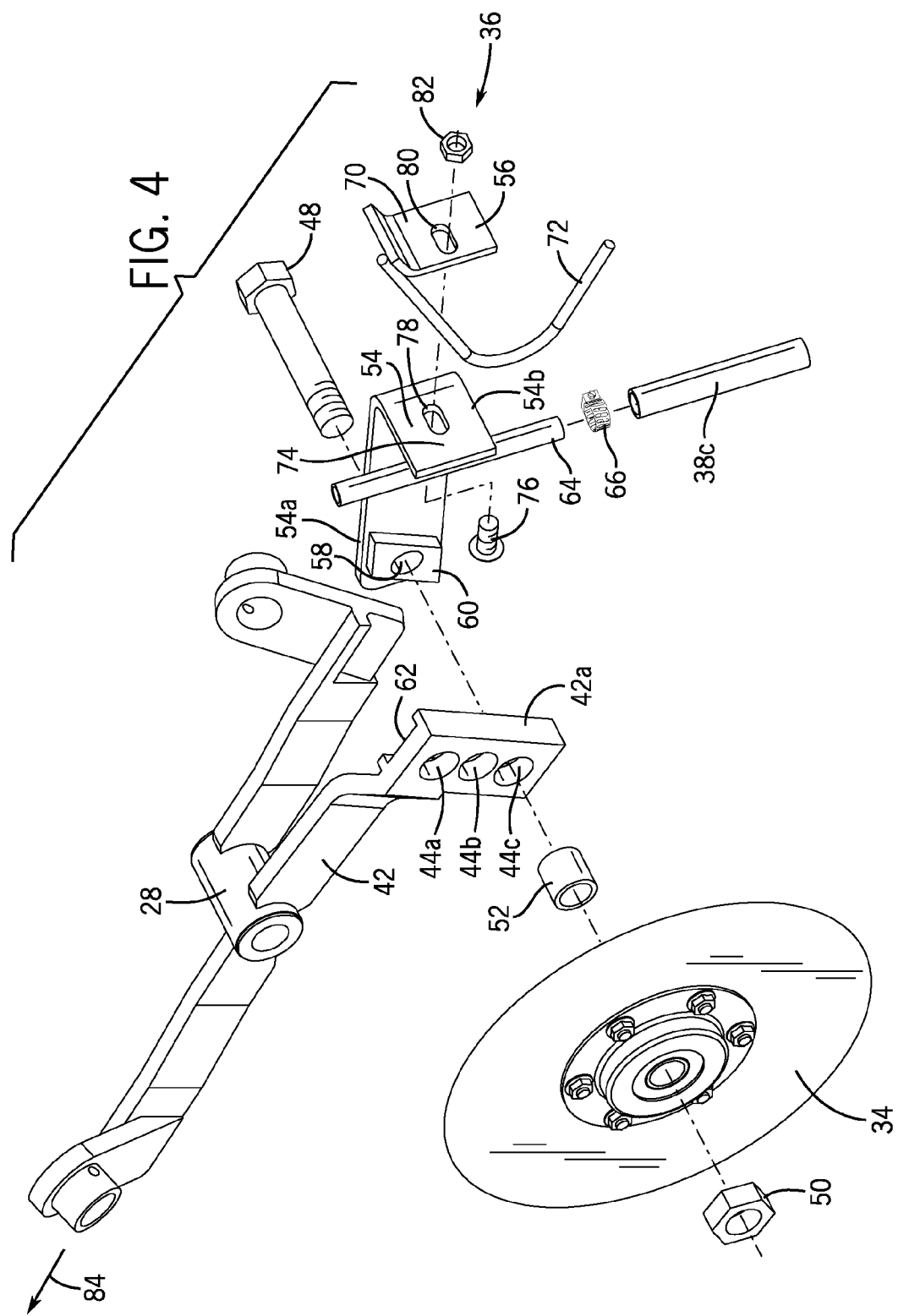
FIG. 4 is an exploded view of a part of the one row unit illustrated in FIG. 3.

With reference to FIG. 4, the fertilizer disc 34 may be removably attached and adjustable relative to a free end 42a of a cantilevered arm 42 of the chassis 28. As shown in FIG. 4, a plurality of vertically-spaced apertures 44a, 44b, 44c may be formed in the free end 42a of the cantilevered arm 42. Each of the apertures 44a, 44b, 44c may be configured to receive an axle, such as a threaded bolt 48, that couples the fertilizer disc 34 to the chassis 28.

To adjust a depth of the fertilizer disc 34, the bolt 48 may be positioned through one of the plurality of apertures 44a, 44b, 44c that corresponds to a desired disc depth. To reduce the depth the fertilizer disc 34 extends into the ground, thereby reducing the depth of a resulting fertilizer furrow, the bolt 48 may be positioned in a higher level aperture 44b or 44c. To increase the depth the fertilizer disc 34 extends into the ground, thereby increasing the depth of a resulting fertilizer furrow, the bolt 48 may be positioned in a lower level aperture 44b or 44a. Although three apertures 44a, 44b, 44c are provided in FIG. 4, more or less apertures may be provided depending on the implementation. A retainer, such as a nut 50, may threadably engage the bolt 48 to secure the fertilizer disc 34 to the chassis 28 about the bolt 48. A spacer 52 may be sleeved over the bolt 48 and positioned between the free end 42a of the cantilevered arm 42 and the fertilizer disc 34 to laterally offset the disc 34 from the chassis 28.

With reference to FIGS. 3-8, a debris member 56 may be operably associated with a fertilizer disc 34 of each row unit 24. The debris member 56 may prevent debris, such as sticks, cobbs, stalks, etc., from continually sticking and attaching to each disc 34. For example, as the tractor 10 pulls the planter assembly 12 through a field, debris lying in the field or portions of soil may accumulate on the fertilizer discs 34. As the discs 34 rotate (as they are pulled across the field), the debris member 56 may effectively scrape or shear off the debris from the discs 34, thereby reducing or preventing the accumulation of debris on the discs 34. This allows the discs 34 to rotate freely and evenly, thereby ensuring proper seed and/or fertilizer placement.

The debris member 56 may be associated with an attachment bracket 54, which may be part of a fertilizer assembly 36. The attachment bracket 54 may be used to connect the debris member 56 to the chassis 28. The attachment bracket 54 may be constructed out of metal (such as aluminum, steel, metal, alloys, etc.), plastic, ceramic, or other sufficiently strong and durable materials. The attachment bracket 54 may be formed from rectangular bar stock and may be bent or curved into a generally L-shape. The attachment bracket 54 may include a first leg or plate portion 54a and a second leg or plate portion 54b extending transverse, which may be perpendicular, from the first leg portion 54a. The first leg portion 54a may have a longer length than the second leg portion 54b.

As shown in FIG. 4, the first leg portion 54a of the attachment bracket 54 may define a chassis attachment aperture 58 configured to receive a chassis fastener, which may be the bolt 48 used to fasten the disc 34 to the chassis 28, to couple the debris assembly 36 to the chassis 28. Additionally or alternatively, the first leg portion 54a may include a feature or boss 60 protruding from a lateral face of the first leg portion 54a that confronts the free end 42a of the cantilevered arm 42 of the chassis 28. The boss 60 may correspond to a guide track 62 formed in the free end 42a of the cantilevered arm 42. The boss 60 may be rotatably keyed to the guide track 62 to inhibit rotation of the attachment bracket 54 relative to the chassis 28 about a central axis of the chassis attachment aperture 58.

When assembled, the boss 60 may be slidable within the guide track 62 to allow a user to vertically adjust the position of the attachment bracket 54, and thus the fertilizer assembly 36 and the debris member 56, relative to the chassis 28, the fertilizer disc 34, or both. Once the chassis attachment aperture 58 is aligned with one of the plurality of apertures 44a, 44b, 44c, the user may position a fastener through the chassis attachment aperture 58 and one of the plurality of apertures 44a, 44b, 44c to couple the attachment bracket 54 to the chassis 28. The attachment bracket 54 and the fertilizer disc 34 may be attached to the chassis 28 with a single fastener, such as the bolt 48, in which case the attachment bracket (including the debris member 56) and the fertilizer disc 34 are adjusted in unison relative to the chassis 28. Alternatively, attachment bracket 54 and the fertilizer disc 34 may be attached to the chassis 28 with separate fasteners, in which case the attachment bracket 54 (including the debris member 56) may be slidably adjusted relative to the chassis 28 and the fertilizer disc 34. The adjustment of the attachment bracket 54 relative to the chassis 28 and/or the fertilizer disc 34 may be in a generally vertical direction.

Figure 7:
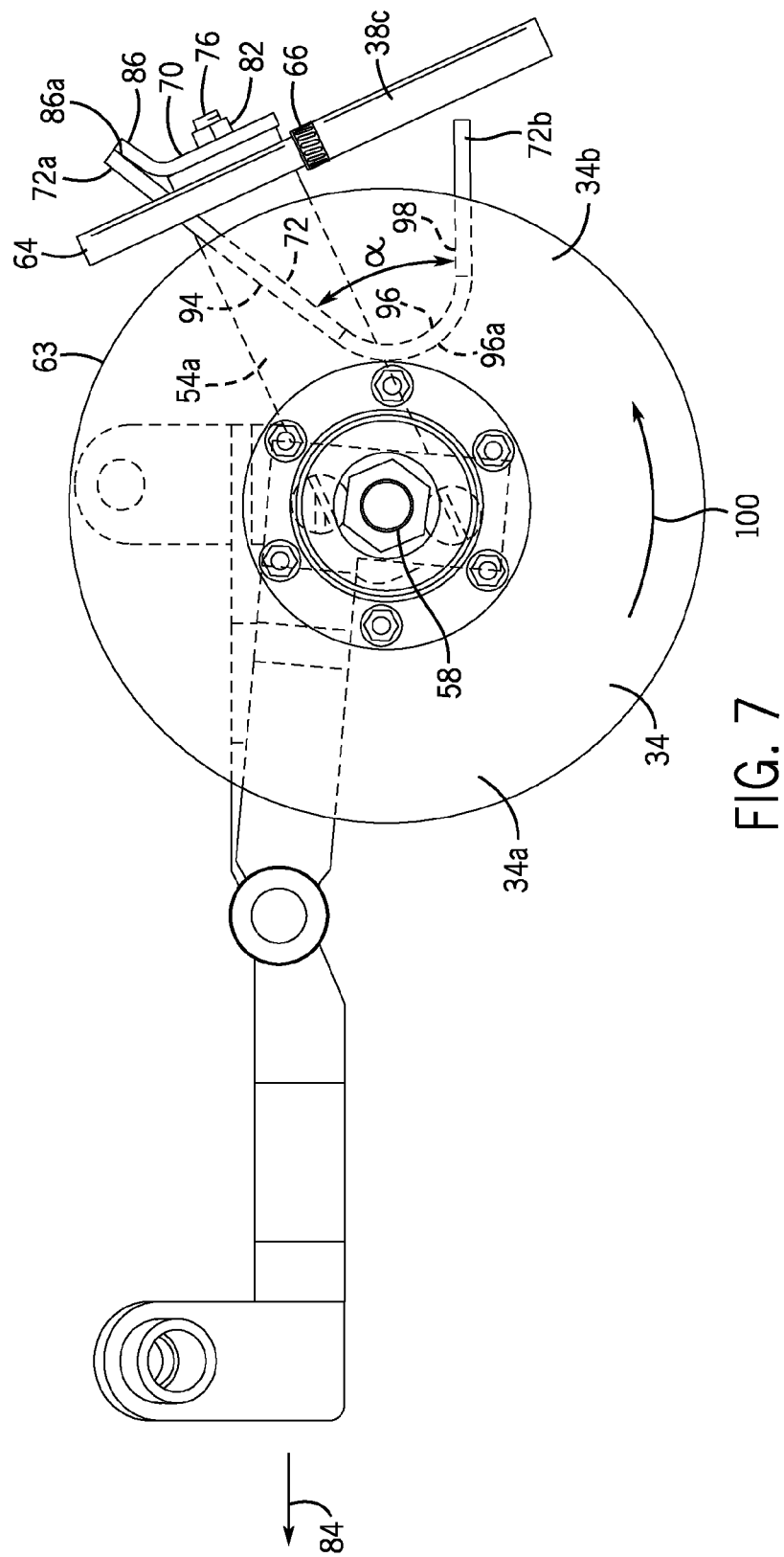
FIG. 7 is a side elevation view of the part of the one row unit illustrated in FIG. 4 with a chassis and disc dashed for clarity.

With reference to FIG. 7, the first leg portion 54a of the attachment bracket 54 may extend radially outward from a central axis of the chassis attachment aperture 58 beyond an outer radial edge 63 of the fertilizer disc 34. The first leg portion 54a may have a radial length that permits a tube fitting 64 to be attached to an inner surface of the second leg portion 54b while be radially spaced beyond the outer radial edge 63 of the fertilizer disc 34 to prevent the tube fitting 64 from contacting and interfering with the rotation of the disc 34. The first leg portion 54a may integrally transition into the second leg portion 54a radially outward of the outer radial edge 63 of the disc 34.

With reference to FIGS. 3-8, the second leg portion 54b of the attachment bracket 54 may extend from an end of the first leg portion 54a in a direction towards the fertilizer disc 34. The second leg portion 54b may be oriented transverse, which may include perpendicular, to the fertilizer disc 34. The second leg portion 54b may be positioned radially outward of the fertilizer disc 34 (see FIGS. 5-7) and may extend laterally beyond at least a portion of the fertilizer disc 34 (see FIG. 5). A fertilizer tube 38c may be connected to the second leg portion 54b by a tube fitting 64, which may be attached to the second leg portion 54b. The tube fitting 64 may be welded, bolted, screwed, or otherwise fastened to the attachment bracket 54. Alternatively, the tube fitting 64 may be formed integrally with the attachment bracket 54 by molding, machining, or otherwise fabricating out of a single piece of material.

The tube fitting 64 may be laterally aligned with the fertilizer disc 34 (see FIG. 5) to ensure fertilizer is deposited within a fertilizer furrow created or opened by the disc 34. The tube fitting 64 may extend beyond opposing upper and lower edges of the second leg portion 54b and be configured to fluidly connect fertilizer tubes 38b and 38c (see FIG. 2). As shown in FIG. 4, an adjustable clamp 66 may secure the fertilizer tube 38c to a lower end of the tube fitting 64. Although not illustrated, an adjustable clamp may secure the fertilizer tube 38b to an upper end of the tube fitting 64. The tube fitting 64 may be constructed out of a similar material as the attachment bracket 54. The tube 38c may be made of a more flexible material than the tube fitting 64 that may flex if the tube 38c contacts the ground in or near the fertilizer furrow. In some implementations, the tube fitting 64 may be shaped to adequately provide fertilizer to each furrow without the need for the fertilizer tube 38c.

With further reference to FIGS. 3-8, the debris member 56 may include a positioning element 70 or base and an elongate element 72. The positioning element 70 may be movable relative to the attachment bracket 54 in at least one direction. After being moved to a desired position, the positioning element 70 may be securable to the attachment bracket 54 to retain the positioning element 70 in the desired position. The positioning element 70 may be formed from a plate of substantially uniform thickness.

In one implementation, the positioning element 70 is slidable relative to the attachment bracket 54 in a lateral direction transverse to a direction of travel of the fertilizer disc 34. To ease movement between the positioning element 70 and the attachment bracket 54, the positioning element 70 may include a substantially flat surface 70a configured to slidably bear against a confronting substantially flat surface 74 of the second leg portion 54b of the attachment bracket 54. To secure the positioning element 70 to the attachment bracket 54, a fastener, such as a bolt 76, may be inserted through apertures 78, 80 formed in the second leg portion 54b of the attachment bracket 54 and the positioning element 70, respectively. A nut 82 may be threaded onto a threaded portion of the bolt to fasten the positioning element 70 to the second leg portion 54b of the attachment bracket 54 once the positioning element 70 is moved to a desired position.

At least one of the apertures 78, 80 may be formed as a slot to permit movement of the positioning element 70 relative to the attachment bracket 54 when the bolt 76 is inserted through the apertures 78, 80. As illustrated in FIG. 4, both of the apertures 78, 80 may be formed as slots to provide the positioning element 70 with a larger range of movement while maintaining the confronting relationship between the positioning element 70 and the second leg portion 54b with the bolt 76 and the nut 82. Once the positioning element 70 is moved to a desired position, the nut 82 may be tightened on the bolt 76 to clamp the positioning element 70 and the second leg portion 54b together, thereby substantially preventing movement of the positioning element 70 relative to the attachment bracket 54.

In implementations where at least one of the apertures 78, 80 is formed as a slot, the slot may be formed in various orientations, including transverse to a direction of travel of the fertilizer disc 34, parallel to a direction of travel of the fertilizer disc, or a combination of both. As illustrated in FIG. 4, both of the apertures 78, 80 are formed as slots oriented transverse, which may be perpendicular, to a direction of travel 84 of the fertilizer disc 34, which generally travels in the same direction of the row unit 24 (see FIG. 2). As illustrated in FIG. 8, the aperture 78 formed in the second leg portion 54b of the attachment bracket 54 may be formed as a slot oriented substantially in line with a direction of travel 84 of the fertilizer disc 34, while the aperture 80 formed in the positioning element 70 may be formed as a slot oriented laterally transverse to a direction of travel 84 of the fertilizer disc 34. In this configuration, the apertures 78, 80 permit movement of the positioning element 70 in multiple directions relative to the second leg portion 54b of the attachment bracket 54.

Figure 5:
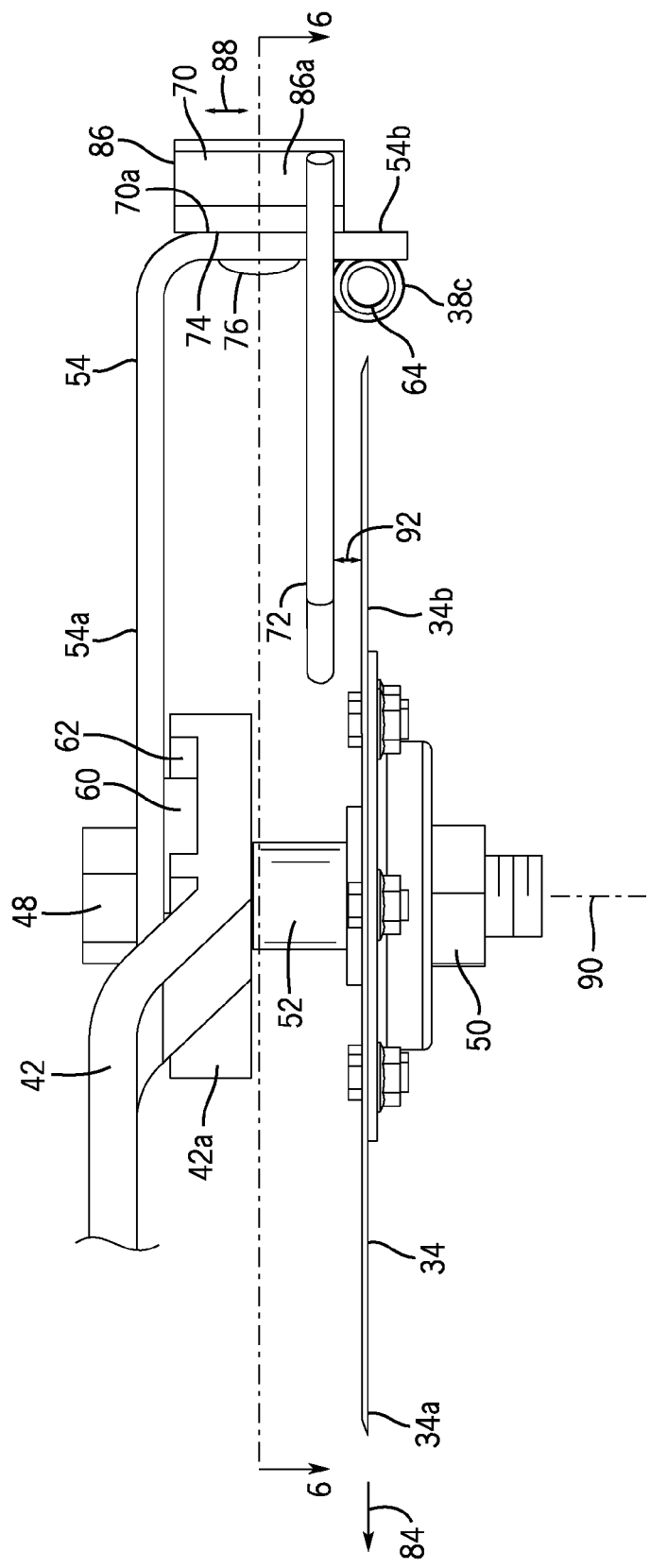
FIG. 5 is a top plan view of the part of the one row unit illustrated in FIG. 4.
Figure 6:
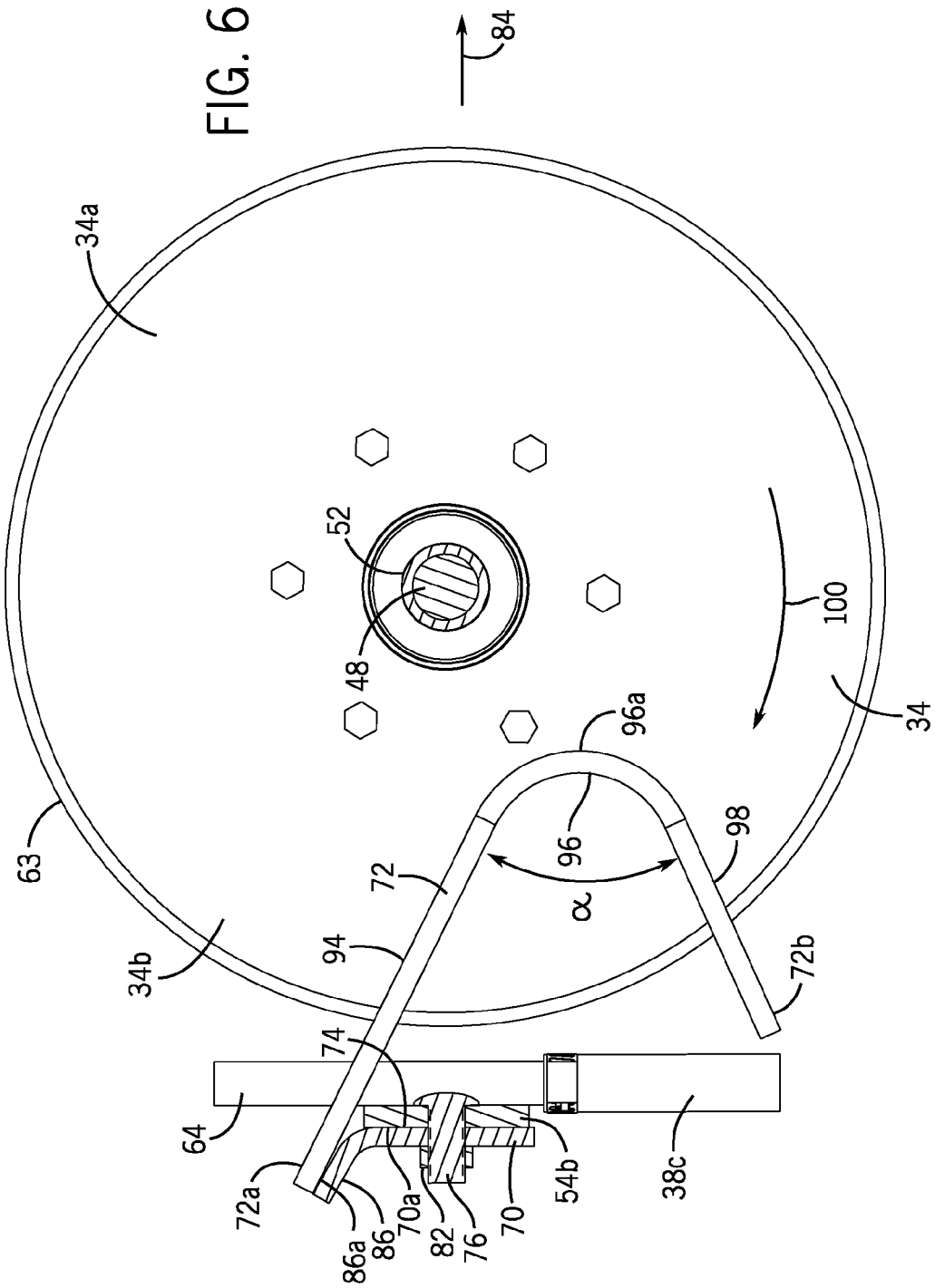
FIG. 6 is a section view of the part of the one row unit illustrated in FIG. 4 taken along line 6-6 as shown in FIG. 5.

The elongate element 72 may be attached to the positioning element 70 so that as the positioning element 70 is translated relative to the second leg portion 54b of the attachment bracket 54, the elongate element 72 is likewise translated relative to the fertilizer disc 34. With reference to FIGS. 5-7, the elongate element 72 may be attached to an upper portion 86 of the positioning element 70. The upper portion 86 may extend above the second leg portion 54b of the attachment bracket 54 and may be angled away from the second leg portion 54b. The upper portion 86 may define an abutment surface 86a configured to support a portion of the elongate element 72.

The elongate element 72 may be formed as a continuous construction with the positioning element 70, or may be separately attached to the positioning element 70. For example, in some implementations, the elongate element 72 may be welded to the positioning element 70. In other embodiments, the positioning element 70 and the elongate element 72 may be molded or otherwise formed together as an integral component or piece.

With reference to FIG. 6, as the positioning element 70 is translated relative to the attachment bracket 54 in a transverse direction 88 (which may be parallel to but offset from a rotation axis 90 of the fertilizer disc 34), the elongate element 72 also may be translated in the transverse direction 88 relative to the fertilizer disc 34. The lateral translation of the elongate element 72 relative to the disc 34 may allow a user to alter the lateral distance or gap 92 between the elongate element 72 and the disc 34. This lateral adjustment of the elongate element 72 relative to the disc 34 may accommodate various planting conditions.

For example, in muddy, heavy residue (e.g., bean residue, corn stalks, etc.) conditions, a user may adjust the elongate element 72 laterally away from the disc 34 to provide more clearance between the elongate element 72 and the disc 34. The additional clearance may allow the heavy residue to pass by the disc 34 without inhibiting the rotation of the disc 34, while the elongate element 72 may remove excess debris from the disc 34 before the debris may build up between the attachment bracket 54 and the fertilizer disc 34 (see FIG. 5) and affect the operation of the disc 34. In muddy, light residue conditions, the user may adjust the elongate element 72 laterally towards the disc 34 to provide less clearance between the elongate element 72 and the disc 34. In dry soil conditions, the user may remove the elongate element 72 from the attachment bracket 54 as debris build up on the disc 34 may be less of a concern.

The magnitude of lateral adjustment of the elongate element 72 relative to the disc 34 may be more or less than one inch. In some implementations, the elongate element 72 may be adjusted to immediately adjacent the disc 34 in which the elongate element 72 contacts or almost contacts the disc 34. From this immediately adjacent position, the elongate element 72 may be laterally translated away from the disc 34 to one-quarter of an inch, three-eighths of an inch, or any suitable distance up to and exceeding one inch. Once the elongate element 72 is moved to a desired position relative to the disc 34, the user may secure the positioning element 70 to the attachment bracket 54 by tightening the bolt 76 and nut 82 until the positioning element 70 is generally immovable relative to the attachment bracket 54.

As shown in FIG. 5, the elongate element 72 may be substantially parallel to the disc 34. Additionally or alternatively, the elongate element 72 may be curved or bent along its length so that it curves or bends toward or away from the disc. For example, as illustrated in FIG. 5, the tube fitting 64 may limit the lateral translation of the elongate element 72 in a direction towards the fertilizer disc 34. In these implementations, the elongate element 72 may be curved or bent around a portion of the periphery of the tube fitting 64 and then transitioned into a substantially planar section that extends in a generally parallel relationship to the disc 34 to permit the elongate element 72 to abut and/or contact an inner surface of the disc 34, if so desired. Additionally or alternatively, the elongate element 72 may be oriented at an angle with respect to the disc, rather than substantially parallel to the disc.

With reference to FIGS. 5-7, the elongate element 72 may be attached to the positioning element 70 at a position radially outward of a trailing portion 34b of the disc 34 (the portion of the disc 34 positioned aft of the rotation axis 90 of the disc 34). From its attached end 72a, the elongate element 72 may extend forward in a substantially straight line beyond the outer radial edge 63 of the disc 34 laterally adjacent the trailing portion 34b of the disc 34 (see FIGS. 6-7).

The substantially straight portion 94 of the elongate element 72 may be downwardly sloping and integrally transition into an arcuate or curved portion 96 that defines a forward convex surface 96a directed towards a leading portion 34a of the disc 34 (the portion of the disc positioned forward of the rotation axis 90 of the disc 34). The arcuate or curved portion 96 of the elongate element 72 may be generally pointed in the direction of travel 84. The arcuate or curved portion 96 may be laterally adjacent the trailing portion 34b of the disc 34.

With continued reference to FIGS. 6-7, the arcuate or curved portion 96 of the elongate element 72 may integrally transition into a substantially straight portion 98 that extends away from the leading portion 34a of the disc 34. The substantially straight portion 98 may extend aft or rearward beyond the outer radial edge 63 of the disc 34 and terminate at a free end 72b of the elongate element 72. The free end 72b may be positioned axially between and vertically below the attached end 72a and the forward convex surface 96a of the elongate element 72. The substantially straight portions 94, 98 of the elongate element may converge towards one another until each of the portions 94, 98 transition into the arcuate portion 96. The substantially straight portions 94, 98 may extend angularly relative to one another by an angle $\alpha$, which may be an acute angle.

The elongate element 72 of the debris member 56 may be configured to remove debris from the disc 34, such as by deflecting or knocking the debris off of the disc 34 and onto the ground. During operation, the disc 34 may be configured to rotate about the rotation axis 90 to create or open a furrow in the ground. As the tractor 10 pulls the row unit 24 through the field, debris in the field may attach or accumulate on a lateral surface of the disc 34. The debris may build up on the lateral surfaces of the disc 34 until it contacts other components of the row unit 24, such as the chassis 28, the attachment bracket 54, or other components. The debris accumulation may restrict the rotation of the disc 34, which may adversely affect the furrow creating or opening operation.

With reference to FIGS. 6-7, the elongate element 72 may be positioned adjacent the trailing portion 34b of the disc 34. As the fertilizer disc 34 is pulled in a travel direction 84 by a tractor 10, the fertilizer disc 34, along with any debris attached to a lateral surface of the disc 34, may rotate in a rotation direction 100. During rotation of the disc 34, the elongate element 72 may deflect, knock off, scrape, shear, or generally remove the debris from the disc 34. The elongate element 72 may remove the debris from the disc 34 before the debris reaches an area between the attachment bracket 54, the fertilizer tube 34c, the tube fitting 64, and/or the disc 34, thereby removing the debris before it may be caught or otherwise trapped between the disc 34 and other components of the row unit 24.

The elongate element 72 of the debris member 56 may be formed to flex when confronted with difficult to remove debris and provide a resilient force that removes the debris from the disc 34. In operation, the debris may generally confront or impact the substantially straight portion 98 of the elongate element 72. As the disc 34 continues to rotate in the rotation direction 100, the debris may cause the substantially straight portion 98 to resiliently deflect about the arcuate or curved portion 96 of the elongate element 72 in an upward direction. The resilient deflection of the substantially straight portion 98 may create a spring-back or reactionary force sufficient to remove the debris from disc 34.

In addition to the resilient deflection of the elongate member about the arcuate portion 96, the debris may cause the substantially straight portion 94 to resiliently deflect about the attached end 72a of the elongate element 72 in an upward direction. The resilient deflection of the substantially straight portion 94 may create a spring-back or reactionary force in the elongate element 72 that is sufficient to remove the debris from the disc 34. The spring-back or reactionary forces in the substantially straight portions 94, 98 of the elongate element 72 may be downwardly directed such that any debris attached to the disc 34 is removed from the trailing portion 34b of the disc 34 towards the ground.

Similar to the resilient nature of the elongate element 72 in the plane of the disc 34, the elongate element 72 may be resilient in a direction out of plane of the disc 34. In some implementations, the elongate element 72 may be substantially rigid in a direction out of plane of the disc 34 such that the elongate element 72 may not substantially deform or deflect in a lateral direction relative to the disc 34. In some implementations, lateral adjustment of the elongate element 72 may be achieved by moving (such as sliding) the elongate element 72 as a single component, piece, or unit relative to the attachment bracket 54, as previously discussed.

The elongate element 72 may have a uniform or varying transverse cross-section. As illustrated in FIGS. 3-8, the elongate element 72 may be formed from a rod, such as spring wire, with a uniform circular cross-section. The elongate element 72 may include other cross-sections, such as rectangular, triangular, or any other suitable shape, which may vary in transverse cross section along the length of the elongate element 72 for resiliency purposes, for example. The elongate element 72 may be constructed out of metal, alloys, plastic, ceramics, combinations thereof, or other suitable materials.

Example debris members provided herein may provide numerous advantages relative to current technology. For example, the debris member may be movable in multiple different directions relative to a disc associated with a farming row unit. The debris member may be laterally translatable relative to the disc. The lateral movement of the debris member may allow a user to alter or change the distance between the debris member and the disc depending upon the field conditions. The lateral adjustability may allow use of the debris member in substantially all field conditions, thereby ensuring an associated disc is operating properly in the field regardless of the conditions. Additionally, the debris member may be movable in a plane substantially parallel to the disc. The debris member may be vertically movable relative to the disc to adjust the height of the debris member relative to the ground. Further, the debris member may be axially movable relative to the disc. The axial adjustability of the debris member may allow a user to maintain a substantially consistent overlap between the debris member and the disc during operation, thereby accounting for reductions in disc diameter due to wear.

As another example, the debris member may be removably attached to the row unit. This may be advantageous in situations where field conditions are such that the debris member is not necessary. Additionally or alternatively, the debris member may be removably attached to a bracket used to support a fertilizer tube, and thus a separate bracket for the debris member may not be necessary.

While the provided figures illustrate a debris member in conjunction with a fertilizer disc, the debris member may be used in conjunction any disc, wheel, or rotating device that collects debris along its surfaces. For example, the debris member may be used in conjunction with a seed disc, wheel, or both. Further, although the provided figures illustrate a debris member associated with one lateral side of a fertilizer disc, the debris member may be associated with either or both lateral sides of the disc. In addition, although the debris member is illustrated as being part of a tractor-pulled fertilizing assembly, the debris member may be part of any other movable device with wheels, for instance, a coulter, ripper, or the like.

All directional references (e.g., upper, lower, upward, downward, left, right, leftward, rightward, top, bottom, above, below, inner, outer, vertical, horizontal, clockwise, and counterclockwise) are only used for identification purposes to aid the reader's understanding of the examples of the invention, and do not create limitations, particularly as to the position, orientation, or use of the invention unless specifically set forth in the claims. Joinder references (e.g., attached, coupled, connected, joined, and the like) are to be construed broadly and may include intermediate members between a connection of elements and relative movement between elements. As such, joinder references do not necessarily infer that two elements are directly connected and/or in fixed relation to each other.

In some instances, components are described with reference to "ends" having a particular characteristic and/or being connected with another part. However, those skilled in the art will recognize that the present invention is not limited to components which terminate immediately beyond their points of connection with other parts. Thus, the term "end" should be interpreted broadly, in a manner that includes areas adjacent, rearward, forward of, or otherwise near the terminus of a particular element, link, component, part, member or the like.

In methodologies directly or indirectly set forth herein, various steps and operations are described in one possible order of operation, but those skilled in the art will recognize that steps and operations may be rearranged, replaced, or eliminated or have other steps inserted without necessarily departing from the spirit and scope of the present invention. It is intended that all matter contained in the above description or shown in the accompanying drawings shall be interpreted as illustrative only and not limiting. Changes in detail or structure may be made without departing from the spirit of the invention as defined in the appended claims.

Although the present invention has been described with respect to particular apparatuses, configurations, components, systems and methods of operation, it will be appreciated by those of ordinary skill in the art upon reading this disclosure that certain changes or modifications to the embodiments and/or their operations, as described herein, may be made without departing from the spirit or scope of the invention. Accordingly, the proper scope of the invention is defined by the appended claims. The various embodiments, operations, components and configurations disclosed herein are generally exemplary rather than limiting in scope.

What is claimed is:

1. A debris assembly for an agricultural row unit having a furrow opener, comprising:
   a bracket attached to the agricultural row unit;
   a debris member having a base;
   a boss extending from the bracket such that the boss is operable to be removably and adjustably engaged with an opposing element for selective positioning of the debris member relative to the furrow opener and the boss is operable to be slidably received in the opposing element, wherein the base of the debris member includes a positioning element that slidably bears against a portion of the bracket such that the boss is operable to adjust the debris member via the bracket in a first direction along a first plane and the base is operable to adjust the debris member on the bracket in a second direction along a second plane.

2. The assembly of claim 1, wherein the debris member includes an elongate element that is fixedly attached to the positioning element.

3. The assembly of claim 2, wherein the elongate element defines an interior acute angle.

4. The assembly of claim 1, wherein the boss is located at an opposite end of the bracket from the debris member.

5. The assembly of claim 1, wherein the boss is shaped such that the boss rotatably keys to the opposing element.

6. The assembly of claim 1, wherein the opposing element is a guide track having a plurality of apertures.

7. The assembly of claim 6, wherein the plurality of apertures on the guide track of the bracket are aligned with respect to one another.

8. The assembly of claim 1, wherein the bracket has a first end and a second end, wherein the second end of the bracket is offset from the first end of the bracket towards the furrow opener.

9. A debris assembly for an agricultural row unit having a furrow opener, comprising:
   a bracket attached to the agricultural row unit;
   a debris member having a base;
   a boss extending from the bracket such that the boss is operable to be removably and adjustably engaged with an opposing element defined by a guide track having a plurality of apertures for selective positioning of the debris member relative to the furrow opener and the plurality of apertures on the guide track of the bracket are aligned with respect to one another, wherein the boss has an aperture and the boss is operable to be slidably received in the opposing element and the base of the debris member includes a positioning element that slidably bears against a portion of the bracket such that the boss is operable to adjust the debris member via the bracket in a first direction and the base is operable to adjust the debris member on the bracket in a second direction.

10. The assembly of claim 9, wherein a fastener extends through at least one of the plurality of apertures of the guide track and the aperture of the boss to secure the bracket and the base together.

11. The assembly of claim 10, wherein the fastener extends through the furrow opener.

12. The assembly of claim 9, wherein the plurality of apertures are generally vertical with respect to a direction of travel of the furrow opener.

13. The assembly of 9, wherein the aperture on the positioning element of the base of the debris member is a slot.

* * * * *